E. R. STOEKLE.
REGULATING MEANS FOR ALTERNATING CURRENT CIRCUITS.
APPLICATION FILED JUNE 14, 1920.
1,420,885.  Patented June 27, 1922.
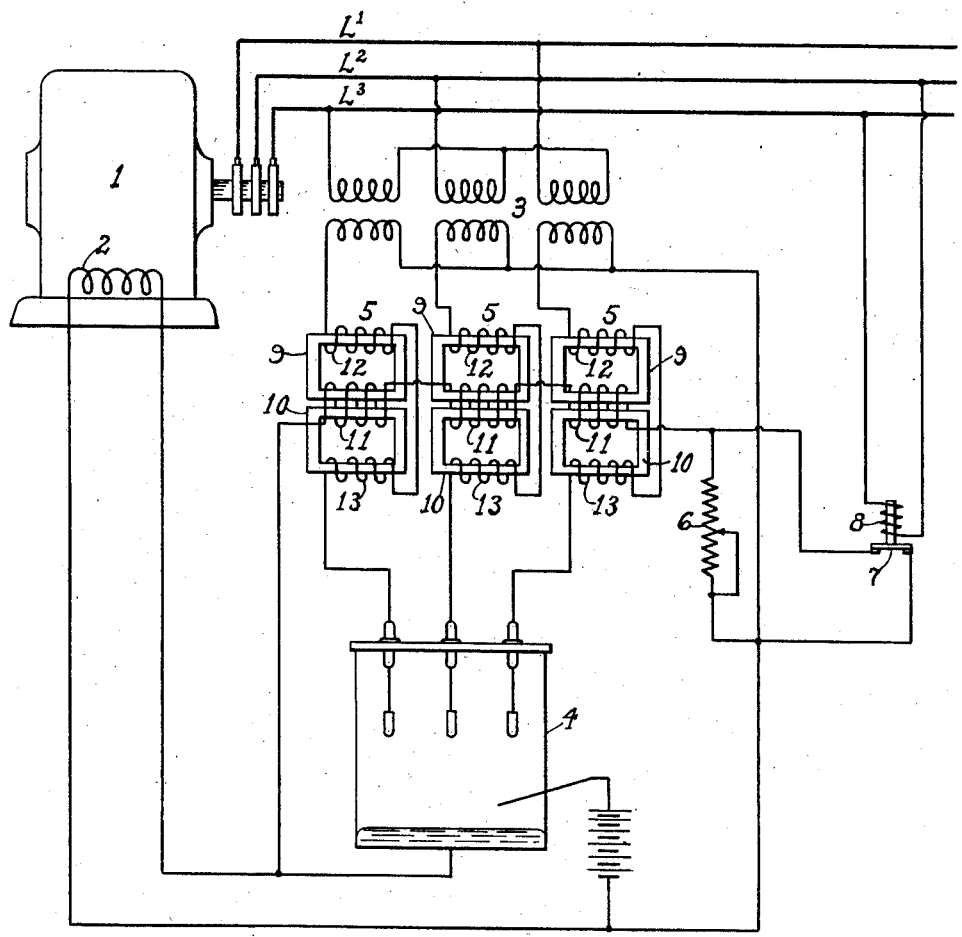
Inventor
Erwin R. Stoekle
By Frank M. Hubbard
Attorney

UNITED STATES PATENT OFFICE.

ERWIN R. STOEKLE, OF MILWAUKEE, WISCONSIN, ASSIGNOR TO THE CUTLER-HAMMER MFG. CO., OF MILWAUKEE, WISCONSIN, A CORPORATION OF WISCONSIN.

REGULATING MEANS FOR ALTERNATING-CURRENT CIRCUITS.

1,420,885.  Specification of Letters Patent.  Patented June 27, 1922.

Application filed June 14, 1920. Serial No. 388,781.

*To all whom it may concern:*

Be it known that I, ERWIN R. STOEKLE, a citizen of the United States, residing at Milwaukee, in the county of Milwaukee and State of Wisconsin, have invented new and useful Improvements in Regulating Means for Alternating-Current Circuits, of which the following is a full, clear, concise, and exact description, reference being had to the accompanying drawing, forming a part of this specification.

This invention relates to regulating means for alternating current circuits.

More particularly the invention relates to means whereby regulation of an electrical condition of an alternating current circuit may be effected without interruption of power currents and without involving the use of heavy moving parts whereby prompt and sensitive regulation may be effected.

According to the present invention it is proposed to control an electrical condition, such as voltage, of an alternating current circuit through appropriate field control of the generator supplying such circuit, such control being effected by means of a suitable number of reactors rendered responsive to the electrical condition of such circuit which it is desired to control.

While the invention is capable of assuming various forms, the embodiment thereof shown diagrammatically in the accompanying drawing may for purposes of illustration be preferred.

Referring to the drawing, which comprises a simple figure, the same illustrates a three phase alternating current circuit indicated by lines $L^1$, $L^2$, $L^3$ to be supplied by a generator 1 and to be controlled as to its voltage condition by the means hereinafter described. Said generator is provided with field windings indicated at 2 to be energized from said output lines through a three phase transformer 3 and a three phase mercury rectifier 4 or other converter.

The secondary windings of the transformer 3 are star connected and the neutral point thereof is in turn connected through the generator field windings 2 to the cathode of the rectifier 4. The opposite ends of the respective transformer secondary windings are respectively connected to the individual anodes of the rectifier.

Similar regulable reactors 5 are interposed between said transformer and said rectifier, said reactors being arranged, as regards the energy transmitted thereby, in parallel with one another in the three lines of the transformer secondary circuit, and being arranged as regards the regulative circuits thereof in series relation with one another and jointly in shunt to the field winding 2 of the generator. A resistor 6 of regulable value is arranged to be included in said regulative circuit of the reactors and to be short circuited therefrom in response to action of a relay 7 or other device rendered sensitive to the electrical condition which it is desired to regulate. In the construction illustrated the relay 7 is provided with an energizing winding 8 connected across lines $L^2$, $L^3$ of the generator output circuit whereby said relay is rendered responsive to variations in voltage of said circuit for effecting inclusion or exclusion of the resistor 6.

Each reactor 5 comprises a pair of continuous magnetic frames 9, 10 having one leg of each arranged parallel with and adjacent to a corresponding leg of the other and surrounded by a common coil 11, the remote legs of said frames being provided with individual coils 12 and 13 so arranged that the fluxes induced thereby oppose and neutralize one another as regards the coil 11. The coils 12 and 13 of each reactor are connected in series with one another in one line of the transformer secondary circuit whereas the coils 11 of the several reactors are connected in series with one another and with the resistor 6 and arranged to be supplied with direct current from the rectifier 4, subject to regulation through the aforementioned action of relay 7.

The operation of the foregoing system for voltage regulation may be described as follows, assuming calibration of the relay 7 to vibrate upon variation of the line voltage from the value which it is desired to maintain. A drop in the line voltage permits said relay to close. thus shortcircuiting the resistor 6 and permitting an augmented flow of current through the regulative coils 11 of the reactors 5. Such increased current in said coils serves to diminish the permeability of the magnetic frames about which the same are wound whereby the inductance of the coils 12 and 13 is diminished and a greater current is permitted to flow through the reactors to the rectifier 4. Such increased current effects a corresponding increase in field excitation of the generator 1, thus restoring the voltage in the output lines $L^1$, $L^2$, $L^3$ to the desired value.

Similarly upon a rise in line voltage above the desired value the relay 7 is temporarily maintained open thereby including the resistor 6 in the regulative circuit of the reactors 5 and producing effects the converse of those aforedescribed for reducing the voltage of the output lines. The self induction of the system serves to introduce a time lag in the carrying out of the foregoing control whereby over regulation and hunting effects are avoided.

The value of the resistor 6 may be adjusted for determining the degree of regulation effected.

While the foregoing description applies primarily to regulation of the controlled circuit for constant voltage, it is obvious that the scope of the invention is not so limited, it being readily apparent to one skilled in the art that the relay 7 or a substituted means may be rendered sensitive to other electrical conditions, such as current, of the output circuit, whereby the device is adapted to regulate such other electrical condition of said circuit. Moreover, the scope of the invention is not limited to field excitation of the generator by energy derived from the output circuit.

What I claim as new and desire to secure by Letters Patent is:

1. The combination with an alternating current circuit, a generator to supply electrical energy thereto and a converter to be supplied with alternating current to provide for field excitation of the generator, of means for regulating an electrical condition of said circuit, comprising a reactor having a winding connected in the field circuit of said generator, means for effecting in said reactor a flux for regulating the energy transmitted through said winding and means responsive to variations in such electrical condition of said circuit for regulating the value of said flux.

2. The combination with an alternating current circuit, a generator to supply electrical energy thereto and a converter providing for field excitation of said generator by energy supplied from said circuit, of means for regulating an electrical condition of said circuit, comprising a reactor having a winding connected in the field circuit of said generator, means for effecting in said reactor a flux for regulating the energy transmitted through said winding and means responsive to variations in such electrical condition of said circuit for regulating the value of said flux.

3. The combination with an alternating current circuit, a generator to supply electrical energy thereto, a transformer and a converter adapted to provide direct current field excitation for said generator by energy supplied from said circuit, of means for regulating an electrical condition of said circuit comprising a reactor having a winding arranged to be traversed by current flowing between said transformer and said converter, means for effecting in said reactor a flux for regulating the current transmitted through said winding and means responsive to variations in such electrical condition of said circuit for regulating the value of said flux.

4. The combination with an alternating current circuit, a generator to supply electrical energy thereto, a transformer and a converter adapted to provide direct current field excitation for said generator by energy supplied from said circuit, of means for regulating an electrical condition of said circuit, comprising a number of reactors equal to the number of phases of said circuit, each of said reactors having a winding arranged to be traversed by current flowing between said transformer and said converter, means for effecting in said reactors fluxes for regulating the currents transmitted through said windings and common means responsive to variations in such electrical condition of said circuit for regulating the value of said fluxes.

5. The combination with an alternating current circuit, a generator to supply electrical energy thereto and a converter providing for field excitation of said generator by energy supplied from said circuit, of means for regulating an electrical condition of said circuit, comprising a reactor having a coil connected between said converter and the source of energy supplied thereto and an additional coil adapted to be supplied with direct current from said converter, a resistor to be included in series with said latter coil and means responsive to variations in such electrical condition of said circuit for effecting inclusion and exclusion of said resistor.

6. The combination with an alternating current circuit, a generator to supply electrical energy thereto, a transformer and a converter adapted to provide direct current field excitation for said generator by energy supplied from said circuit, of means for regulating the voltage of said circuit, comprising a reactor having a coil arranged to be traversed by alternating current supplied from said transformer to said converter and a coil to be supplied with direct current from said converter to effect a flux in said reactor for regulating the value of current transmitted through said former coil, a resistor to be included in circuit with said latter coil and a device responsive to voltage variations in said circuit for effecting inclusion and exclusion of said resistor.

In witness whereof, I have hereunto subscribed my name.

ERWIN R. STOEKLE.